(12) United States Patent
Barreira Avegliano et al.

(10) Patent No.: US 10,021,445 B2
(45) Date of Patent: *Jul. 10, 2018

(54) AUTOMATIC SYNCHRONIZATION OF SUBTITLES BASED ON AUDIO FINGERPRINTING

(71) Applicant: International Business Machines Corporation, Armonk, NY (US)

(72) Inventors: Priscilla Barreira Avegliano, Sao Paulo (BR); Lucas Correia Villa Real, Sao Paulo (BR); Rodrigo Laiola Guimaraes, Sao Paulo (BR); Diego Sanchez Gallo, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/346,937

(22) Filed: Nov. 9, 2016

(65) Prior Publication Data

US 2017/0188084 A1 Jun. 29, 2017

Related U.S. Application Data

(63) Continuation of application No. 14/981,173, filed on Dec. 28, 2015, now Pat. No. 9,609,397.

(51) Int. Cl.
*H04N 21/43* (2011.01)
*H04N 21/8547* (2011.01)
(Continued)

(52) U.S. Cl.
CPC ......... *H04N 21/4302* (2013.01); *G11B 27/10* (2013.01); *G11B 27/11* (2013.01); *G11B 27/28* (2013.01); *H04N 21/233* (2013.01); *H04N 21/235* (2013.01); *H04N 21/23424* (2013.01); *H04N 21/4394* (2013.01); *H04N 21/44* (2013.01); *H04N 21/4856* (2013.01);
(Continued)

(58) Field of Classification Search
CPC .................................................. H04N 21/4394
USPC ................................ 348/482–486, 738, 500
See application file for complete search history.

(56) References Cited

U.S. PATENT DOCUMENTS

| 6,249,120 B1 | 6/2001 | McKinnon et al. |
| 8,161,071 B2 | 4/2012 | LaJoie et al. |

(Continued)

FOREIGN PATENT DOCUMENTS

| CA | 2129925 A1 | 2/1996 |
| CN | 102982832 A | 3/2013 |

(Continued)

OTHER PUBLICATIONS

List of IBM Patents or Patent Applications Treated as Related, dated Nov. 9, 2016, 2 pages.

(Continued)

*Primary Examiner* — Paulos M Natnael
(74) *Attorney, Agent, or Firm* — Scully, Scott, Murphy & Presser, P.C.; Louis J. Percello, Esq.

(57) ABSTRACT

Various mechanisms presented in this disclosure provide for dynamically adjusting the exhibition of subtitles. In one example, check-points are introduced into the subtitle file format that, once achieved by a multimedia player, provoke the rescheduling of the moment in which the texts contained in the subtitle file will be exhibited.

18 Claims, 11 Drawing Sheets

(51) Int. Cl.
*H04N 21/488* (2011.01)
*H04N 21/233* (2011.01)
*H04N 21/234* (2011.01)
*H04N 21/235* (2011.01)
*H04N 21/439* (2011.01)
*H04N 21/44* (2011.01)
*H04N 21/485* (2011.01)
*H04N 21/81* (2011.01)
*G11B 27/10* (2006.01)
*G11B 27/11* (2006.01)
*G11B 27/28* (2006.01)

(52) U.S. Cl.
CPC ..... *H04N 21/4884* (2013.01); *H04N 21/8126* (2013.01); *H04N 21/8547* (2013.01)

(56) References Cited

U.S. PATENT DOCUMENTS

| | | | |
|---|---|---|---|
| 8,677,400 B2 | 3/2014 | LaJoie et al. | |
| 8,761,568 B2 | 6/2014 | Ergin | |
| 9,256,675 B1 | 2/2016 | Wiegering et al. | |
| 9,553,756 B2 * | 1/2017 | Stokking | H04L 29/06517 |
| 9,609,395 B2 * | 3/2017 | Abecassis | H04N 21/8133 |
| 9,609,397 B1 * | 3/2017 | Barreira Avegliano | H04N 21/8547 |
| 2005/0180462 A1 | 8/2005 | Yi | |
| 2005/0227614 A1 | 10/2005 | Hosking et al. | |
| 2007/0140656 A1 | 6/2007 | Ergin | |
| 2007/0250194 A1 | 10/2007 | Rhoads et al. | |
| 2011/0063503 A1 * | 3/2011 | Brand | H04N 5/4401 348/500 |
| 2012/0020647 A1 * | 1/2012 | Vogel | H04N 5/765 386/251 |
| 2012/0239690 A1 * | 9/2012 | Asikainen | G06F 17/3082 707/770 |
| 2012/0303663 A1 * | 11/2012 | Asikainen | G06F 17/3069 707/780 |
| 2013/0162902 A1 * | 6/2013 | Musser, Jr. | G11B 27/10 348/515 |
| 2013/0216202 A1 | 8/2013 | Palakshamurthy et al. | |
| 2013/0321713 A1 * | 12/2013 | Scavo | H04N 5/60 348/738 |
| 2013/0338453 A1 | 12/2013 | Duke et al. | |
| 2014/0007152 A1 * | 1/2014 | Pora | H04N 21/254 725/18 |
| 2014/0032973 A1 * | 1/2014 | Baker | G06F 11/3072 714/39 |
| 2015/0113558 A1 | 4/2015 | Ozawa et al. | |
| 2015/0370435 A1 | 12/2015 | Kirmse et al. | |
| 2015/0370864 A1 | 12/2015 | Oztaskent et al. | |
| 2015/0370902 A1 | 12/2015 | Oztaskent et al. | |
| 2015/0373428 A1 * | 12/2015 | Trollope | H04N 21/8133 704/235 |
| 2016/0005412 A1 * | 1/2016 | Fenet | G06F 17/30743 704/205 |
| 2016/0073141 A1 * | 3/2016 | Brand | H04N 5/4401 725/32 |

FOREIGN PATENT DOCUMENTS

| | | |
|---|---|---|
| EP | 2574054 A1 | 3/2013 |
| WO | 2011/144775 A1 | 11/2011 |

OTHER PUBLICATIONS

"Vlsub", https://github.com/exebetche/vlsub, printed on Dec. 28, 2015, pp. 1-5.

"VLC media player", http://www.videolan.org/vlc/index.html, printed on Dec. 28, 2015, pp. 1-3.

Brooks, M. et al., "Enhancing Subtitles", TVX'14, Jun. 25-Jun. 27, 2014, pp. 1-2.

Notice of Allowance dated Nov. 16, 2016 received in parent U.S. Appl. No. 14/981,173, 10 pages.

* cited by examiner

```
01. ...
02. 615                                                       101
03. 00:50:02.280 --> 00:50:06.046
04.   speaker 1: xxxxxxxxxxxxxxxxxxxxxxxxx
05.   xxxxxxxxxxxxxxxxxxxxxxxxxx
06.
07. 616
08. 00:50:06,120 --> 00:50:10,489
09.   speaker 2: YYYYYYYYYYYYYYYYYYYYYY
10.   YYYYYYYYYYYYYYYYYYYYY
11.
12. 617
13. 00:50:10,693 --> 00:50:12,711
14. [crowd shouting]
15. ...
```

```
01. ...
02. 729                                                       103
03. 00:48:25.351 --> 00:48:28.937
04.   speaker 1: xxxxxxxxxxxxxxxxxxxxxxxxx
05.   xxxxxxxxxxxxxxxxxxxxxxxx
06.
07. 730
08. 00:48:28,971 --> 00:48:31,139
09.   speaker 2: YYYYYYYYYYYYYYYYYYYYYY
10.
11. 731
12. 00:48:31,141 --> 00:48:33,475
13.   speaker 2: YYYYYYYYYYYYYY
14. ...
```

FIG. 1
Prior Art

```
01.  0                                                        301
02.  00:00:00,000 --> 00:00:00,000
03.  @fingerprint@ -177,-168,-167,...,934,934,904
04.
05.  1
06.  00:01:46,144 --> 00:01:48,831
07.  - (someone laughing)
08.  - Ramsay: Tansy!
```

```
                    ┌─────────────┐
                    │ From Fig. 5A │
                    └──────┬──────┘
                           ▼
```

RESPONSIVE TO DETERMINING THAT AT THE TIME PERIOD IN THE MULTIMEDIA FILE BEGINNING AT THE TIME CORRESPONDING TO THE IDENTIFIED TIME START POINT IN THE SUPPLEMENTAL CONTENT THE AUDIO FINGERPRINT OF THE SOUND TRACK OF THE MULTIMEDIA FILE DOES NOT MATCH THE IDENTIFIED AUDIO FINGERPRINT OF THE SUPPLEMENTAL CONTENT: SEARCHING, BY THE PROCESSOR, THE SOUND TRACK OF THE MULTIMEDIA FILE FROM A BEGINNING OF THE MULTIMEDIA FILE TOWARDS AN END OF THE MULTIMEDIA FILE TO DETERMINE WHETHER THE SOUND TRACK OF THE MULTIMEDIA FILE CONTAINS AN AUDIO FINGERPRINT THAT MATCHES THE IDENTIFIED AUDIO FINGERPRINT OF THE SUPPLEMENTAL CONTENT
511

RESPONSIVE TO DETERMINING THAT THE SOUND TRACK OF THE MULTIMEDIA FILE CONTAINS AN AUDIO FINGERPRINT THAT MATCHES THE IDENTIFIED AUDIO FINGERPRINT OF THE SUPPLEMENTAL CONTENT: IDENTIFYING, BY THE PROCESSOR, A FINGERPRINT TIME PERIOD IN THE SOUND TRACK OF THE MULTIMEDIA FILE WHERE THE MULTIMEDIA FILE CONTAINS THE AUDIO FINGERPRINT THAT MATCHES THE IDENTIFIED AUDIO FINGERPRINT OF THE SUPPLEMENTAL CONTENT; AND DETERMINING, BY THE PROCESSOR, AN OFFSET TIME DIFFERENCE BETWEEN A START TIME OF THE FINGERPRINT TIME PERIOD IN THE SOUNDTRACK OF THE MULTIMEDIA FILE AND THE TIME START POINT IN THE SUPPLEMENTAL CONTENT ASSOCIATED WITH THE IDENTIFIED AUDIO FINGERPRINT
513

FIG. 5B

```
┌─────────────────────────────────────────────────────────────┐
│ OBTAINING BY A PROCESSOR THE MULTIMEDIA BROADCAST,          │
│ WHEREIN THE MULTIMEDIA BROADCAST INCLUDES                   │
│ THEREIN A SOUNDTRACK                                        │
│ 601                                                         │
└─────────────────────────────────────────────────────────────┘
                              │
                              ▼
┌─────────────────────────────────────────────────────────────┐
│ OBTAINING BY THE PROCESSOR THE SUPPLEMENTAL CONTENT,        │
│ WHEREIN THE SUPPLEMENTAL CONTENT INCLUDES THEREIN AT        │
│ LEAST ONE AUDIO FINGERPRINT AND WHEREIN THE AUDIO           │
│ FINGERPRINT INCLUDED IN THE SUPPLEMENTAL CONTENT IS         │
│ ASSOCIATED WITH A TIME START POINT                          │
│ 603                                                         │
└─────────────────────────────────────────────────────────────┘
                              │
                              ▼
┌─────────────────────────────────────────────────────────────┐
│ IDENTIFYING BY THE PROCESSOR, IN THE SUPPLEMENTAL           │
│ CONTENT, THE AUDIO FINGERPRINT                              │
│ 605                                                         │
└─────────────────────────────────────────────────────────────┘
                              │
                              ▼
┌─────────────────────────────────────────────────────────────┐
│ IDENTIFYING BY THE PROCESSOR, IN THE SUPPLEMENTAL           │
│ CONTENT, THE TIME START POINT ASSOCIATED WITH THE           │
│ IDENTIFIED AUDIO FINGERPRINT                                │
│ 607                                                         │
└─────────────────────────────────────────────────────────────┘
                              │
                              ▼
┌─────────────────────────────────────────────────────────────┐
│ DETERMINING BY THE PROCESSOR WHETHER, AT A TIME             │
│ PERIOD IN THE MULTIMEDIA BROADCAST BEGINNING AT A TIME      │
│ CORRESPONDING TO THE IDENTIFIED TIME START POINT IN THE     │
│ SUPPLEMENTAL CONTENT, AN AUDIO FINGERPRINT OF THE           │
│ SOUND TRACK OF THE MULTIMEDIA BROADCAST MATCHES THE         │
│ IDENTIFIED AUDIO FINGERPRINT OF THE SUPPLEMENTAL CONTENT    │
│ 609                                                         │
└─────────────────────────────────────────────────────────────┘
                              │
                              ▼
                        ( To Fig. 6B )
```

FIG. 6A

```
                    ┌─────────────────┐
                    │  From Fig. 6A   │
                    └────────┬────────┘
                             ▼
```

RESPONSIVE TO DETERMINING THAT AT THE TIME PERIOD IN THE MULTIMEDIA BROADCAST BEGINNING AT THE TIME CORRESPONDING TO THE IDENTIFIED TIME START POINT IN THE SUPPLEMENTAL CONTENT THE AUDIO FINGERPRINT OF THE SOUND TRACK OF THE MULTIMEDIA BROADCAST DOES NOT MATCH THE IDENTIFIED AUDIO FINGERPRINT OF THE SUPPLEMENTAL CONTENT: MONITORING, BY THE PROCESSOR, THE SOUND TRACK OF THE MULTIMEDIA BROADCAST AS THE MULTIMEDIA BROADCAST IS OBTAINED TO DETERMINE WHETHER THE SOUND TRACK OF THE MULTIMEDIA BROADCAST CONTAINS AN AUDIO FINGERPRINT THAT MATCHES THE IDENTIFIED AUDIO FINGERPRINT OF THE SUPPLEMENTAL CONTENT
611

RESPONSIVE TO DETERMINING THAT THE SOUND TRACK OF THE MULTIMEDIA BROADCAST CONTAINS AN AUDIO FINGERPRINT THAT MATCHES THE IDENTIFIED AUDIO FINGERPRINT OF THE SUPPLEMENTAL CONTENT: IDENTIFYING, BY THE PROCESSOR, A FINGERPRINT TIME PERIOD IN THE SOUND TRACK OF THE MULTIMEDIA BROADCAST WHERE THE MULTIMEDIA BROADCAST CONTAINS THE AUDIO FINGERPRINT THAT MATCHES THE IDENTIFIED AUDIO FINGERPRINT OF THE SUPPLEMENTAL CONTENT; AND DETERMINING, BY THE PROCESSOR, AN OFFSET TIME DIFFERENCE BETWEEN A START TIME OF THE FINGERPRINT TIME PERIOD IN THE SOUNDTRACK OF THE MULTIMEDIA BROADCAST AND THE TIME START POINT IN THE SUPPLEMENTAL CONTENT ASSOCIATED WITH THE IDENTIFIED AUDIO FINGERPRINT
613

FIG. 6B

AUTOMATIC SYNCHRONIZATION OF SUBTITLES BASED ON AUDIO FINGERPRINTING

BACKGROUND

The present disclosure relates generally to the field of automatic synchronization of subtitles based on audio fingerprinting. In various embodiments, systems, methods and computer program products are provided.

Conventionally, subtitles provide users with audio description and captions representative of events related to the audio and video contents of multimedia streams. Subtitles are frequently used in noisy environments (when the audio contents cannot be perfectly heard, as is often the case of movies watched in airplanes), by hearing impaired persons, by non-speakers of the languages available in the audio streams, and many others.

The golden standard for subtitle generation is the creation of a file containing, essentially, the texts to be displayed and the moment of that exhibition. In professional production, the setting is very well controlled. That is, groups of people are designated to create subtitles for the produced contents and to certify that these subtitles are properly synchronized with the elementary audio and video streams of those contents. The final contents are often packed together in a "transport stream" file that can be later pressed on DVDs, Blu-Rays, or broadcast on TVs. In such professional production, major synchronization problems between a multimedia stream and the subtitles do not typically occur.

On the other hand, non-professional production of subtitles is often based on desktop software that lets users determine sequences of starting times in which a certain text must be exhibited on the screen (and for how long the text should be shown). The resulting subtitles are then saved to popular file formats that most multimedia playback software is able to interpret. Many communities on the Internet (such as online caption databases) are dedicated to sharing these subtitles in a wide range of languages.

With the widespread use of multimedia files and the wide range of hardware platforms in which these files can be played, it is not uncommon that the same multimedia content is available in different formats and resolutions. A consequence is that, depending for example on various newly utilized encoding settings (e.g. different frame rate) and on the presence of modifications to the original contents (e.g., to insert or delete advertisements), there may be multiple versions available for the same content. When such multiple versions are available for the same content, the synchronization of the resulting media with existing subtitles can be compromised, resulting in text messages (that is, subtitles or captions) that are displayed on the screen earlier or later than the corresponding audio or visual events.

FIG. 1 shows an example (using conventional techniques) of such compromised synchronization. More particularly, each of captioning file 101 and captioning file 103 had been intended to be used to caption the same multimedia file (not shown). However, the captioning file 101 and captioning file 103 do not provide the same text at the same time. For example, in caption 615 (see line 2) of captioning file 101 the text is "SPEAKER 1: XXXXXXX XXXXXXXXXXXXXXXXXXXX" (see lines 4 and 5) and the display start and end times are 00:50:02,280 to 00:50:06,046 (see line 3). On the other hand, in the corresponding caption 729 (see line 2) of captioning file 103, where the text is "SPEAKER 1: XXXXXXX XXXXXXXXXXXXXXXXXXXX" (see lines 4 and 5) the display start and end times are 00:48:25,351 to 00:48:28,937 (see line 3).

In another example of a conventional technique, some well-known media players (such as VLC) present the ability of downloading a subtitle file corresponding to a media file to be played. The downloading of the subtitle file is based on the name of the media file to be played. If there is any discrepancy with respect to the time the content of the media file is to be displayed (compared to the file used as a template for the subtitle generation), there will be a mismatch between the sound and the subtitles. It happens in this instance because, in the subtitle file, the moment of exhibition of each subtitle is hardcoded, and not based on the content being displayed.

SUMMARY

Various mechanisms presented in this disclosure provide for dynamically adjusting the exhibition of subtitles.

In one embodiment, a computer-implemented method for synchronizing supplemental content to a multimedia stream is provided, the method comprising: obtaining, by a processor, the multimedia stream; obtaining, by the processor, the supplemental content; identifying by the processor, beginning at an anchor time start point in the multimedia stream, an audio fingerprint of a sound track of the multimedia stream; and inserting by the processor into the supplemental content the audio fingerprint, wherein the audio fingerprint is inserted into the supplemental content in association with a time start point.

In another embodiment, a computer-implemented method for synchronizing supplemental content to a multimedia file is provided, the method comprising: obtaining by a processor the multimedia file, wherein the multimedia file includes therein a soundtrack; obtaining by the processor the supplemental content, wherein the supplemental content includes therein at least one audio fingerprint and wherein the audio fingerprint included in the supplemental content is associated with a time start point; identifying by the processor, in the supplemental content, the audio fingerprint; identifying by the processor, in the supplemental content, the time start point associated with the identified audio fingerprint; determining by the processor whether, at a time period in the multimedia file beginning at a time corresponding to the identified time start point in the supplemental content, an audio fingerprint of the sound track of the multimedia file matches the identified audio fingerprint of the supplemental content; responsive to determining that at the time period in the multimedia file beginning at the time corresponding to the identified time start point in the supplemental content the audio fingerprint of the sound track of the multimedia file does not match the identified audio fingerprint of the supplemental content: searching, by the processor, the sound track of the multimedia file from a beginning of the multimedia file towards an end of the multimedia file to determine whether the sound track of the multimedia file contains an audio fingerprint that matches the identified audio fingerprint of the supplemental content; and responsive to determining that the sound track of the multimedia file contains an audio fingerprint that matches the identified audio fingerprint of the supplemental content: identifying, by the processor, a fingerprint time period in the sound track of the multimedia file where the multimedia file contains the audio fingerprint that matches the identified audio fingerprint of the supplemental content; and determining, by the processor, an offset time difference between a start time of the fingerprint time period in the soundtrack of the multimedia file and the time start point in the supplemental content associated with the identified audio fingerprint.

In another embodiment, a computer-implemented method for synchronizing supplemental content to a multimedia broadcast is provided, the method comprising: obtaining by a processor the multimedia broadcast, wherein the multimedia broadcast includes therein a soundtrack; obtaining by the processor the supplemental content, wherein the supplemental content includes therein at least one audio fingerprint and wherein the audio fingerprint included in the supplemental content is associated with a time start point; identifying by the processor, in the supplemental content, the audio fingerprint; identifying by the processor, in the supplemental content, the time start point associated with the identified audio fingerprint; determining by the processor whether, at a time period in the multimedia broadcast beginning at a time corresponding to the identified time start point in the supplemental content, an audio fingerprint of the sound track of the multimedia broadcast matches the identified audio fingerprint of the supplemental content; responsive to determining that at the time period in the multimedia broadcast beginning at the time corresponding to the identified time start point in the supplemental content the audio fingerprint of the sound track of the multimedia broadcast does not match the identified audio fingerprint of the supplemental content: monitoring, by the processor, the sound track of the multimedia broadcast as the multimedia broadcast is obtained to determine whether the sound track of the multimedia broadcast contains an audio fingerprint that matches the identified audio fingerprint of the supplemental content; and responsive to determining that the sound track of the multimedia broadcast contains an audio fingerprint that matches the identified audio fingerprint of the supplemental content: identifying, by the processor, a fingerprint time period in the sound track of the multimedia broadcast where the multimedia broadcast contains the audio fingerprint that matches the identified audio fingerprint of the supplemental content; and determining, by the processor, an offset time difference between a start time of the fingerprint time period in the soundtrack of the multimedia broadcast and the time start point in the supplemental content associated with the identified audio fingerprint.

In another embodiment, a computer readable storage medium, tangibly embodying a program of instructions executable by the computer for synchronizing supplemental content to a multimedia stream is provided, the program of instructions, when executing, performing the following steps: obtaining the multimedia stream; obtaining the supplemental content; identifying, beginning at an anchor time start point in the multimedia stream, an audio fingerprint of a sound track of the multimedia stream; and inserting into the supplemental content the audio fingerprint, wherein the audio fingerprint is inserted into the supplemental content in association with a time start point.

In another embodiment, a computer readable storage medium, tangibly embodying a program of instructions executable by the computer for synchronizing supplemental content to a multimedia file is provided, the program of instructions, when executing, performing the following steps: obtaining the multimedia file, wherein the multimedia file includes therein a soundtrack; obtaining the supplemental content, wherein the supplemental content includes therein at least one audio fingerprint and wherein the audio fingerprint included in the supplemental content is associated with a time start point; identifying, in the supplemental content, the audio fingerprint; identifying, in the supplemental content, the time start point associated with the identified audio fingerprint; determining whether, at a time period in the multimedia file beginning at a time corresponding to the identified time start point in the supplemental content, an audio fingerprint of the sound track of the multimedia file matches the identified audio fingerprint of the supplemental content; responsive to determining that at the time period in the multimedia file beginning at the time corresponding to the identified time start point in the supplemental content the audio fingerprint of the sound track of the multimedia file does not match the identified audio fingerprint of the supplemental content: searching the sound track of the multimedia file from a beginning of the multimedia file towards an end of the multimedia file to determine whether the sound track of the multimedia file contains an audio fingerprint that matches the identified audio fingerprint of the supplemental content; and responsive to determining that the sound track of the multimedia file contains an audio fingerprint that matches the identified audio fingerprint of the supplemental content: identifying a fingerprint time period in the sound track of the multimedia file where the multimedia file contains the audio fingerprint that matches the identified audio fingerprint of the supplemental content; and determining an offset time difference between a start time of the fingerprint time period in the soundtrack of the multimedia file and the time start point in the supplemental content associated with the identified audio fingerprint.

In another embodiment, a computer readable storage medium, tangibly embodying a program of instructions executable by the computer for synchronizing supplemental content to a multimedia broadcast is provided, the program of instructions, when executing, performing the following steps: obtaining the multimedia broadcast, wherein the multimedia broadcast includes therein a soundtrack; obtaining the supplemental content, wherein the supplemental content includes therein at least one audio fingerprint and wherein the audio fingerprint included in the supplemental content is associated with a time start point; identifying, in the supplemental content, the audio fingerprint; identifying, in the supplemental content, the time start point associated with the identified audio fingerprint; determining whether, at a time period in the multimedia broadcast beginning at a time corresponding to the identified time start point in the supplemental content, an audio fingerprint of the sound track of the multimedia broadcast matches the identified audio fingerprint of the supplemental content; responsive to determining that at the time period in the multimedia broadcast beginning at the time corresponding to the identified time start point in the supplemental content the audio fingerprint of the sound track of the multimedia broadcast does not match the identified audio fingerprint of the supplemental content: monitoring the sound track of the multimedia broadcast as the multimedia broadcast is obtained to determine whether the sound track of the multimedia broadcast contains an audio fingerprint that matches the identified audio fingerprint of the supplemental content; and responsive to determining that the sound track of the multimedia broadcast contains an audio fingerprint that matches the identified audio fingerprint of the supplemental content: identifying a fingerprint time period in the sound track of the multimedia broadcast where the multimedia broadcast contains the audio fingerprint that matches the identified audio fingerprint of the supplemental content; and determining an offset time difference between a start time of the fingerprint time period in the soundtrack of the multimedia broadcast and the time start point in the supplemental content associated with the identified audio fingerprint.

In another embodiment, a computer-implemented system for synchronizing supplemental content to a multimedia stream is provided, the system comprising: a processor; and an instruction memory storing computer readable instructions that, when executed by the processor, implement: a first obtaining element configured to obtain the multimedia stream; a second obtaining element configured to obtain the supplemental content; an identifying element configured to identify, beginning at an anchor time start point in the multimedia stream, an audio fingerprint of a sound track of the multimedia stream; and an inserting element configured to insert into the supplemental content the audio fingerprint, wherein the audio fingerprint is inserted into the supplemental content in association with a time start point.

In another embodiment, a computer-implemented system for synchronizing supplemental content to a multimedia file is provided, the system comprising: a processor; and an instruction memory storing computer readable instructions that, when executed by the processor, implement: a first obtaining element configured to obtain the multimedia file, wherein the multimedia file includes therein a soundtrack; a second obtaining element configured to obtain the supplemental content, wherein the supplemental content includes therein at least one audio fingerprint and wherein the audio fingerprint included in the supplemental content is associated with a time start point; a first identifying element configured to identify, in the supplemental content, the audio fingerprint; a second identifying element configured to identify, in the supplemental content, the time start point associated with the identified audio fingerprint; a first determining element configured to determine whether, at a time period in the multimedia file beginning at a time corresponding to the identified time start point in the supplemental content, an audio fingerprint of the sound track of the multimedia file matches the identified audio fingerprint of the supplemental content; a searching element configured to search the sound track of the multimedia file from a beginning of the multimedia file towards an end of the multimedia file to determine whether the sound track of the multimedia file contains an audio fingerprint that matches the identified audio fingerprint of the supplemental content, wherein the searching element searches the sound track of the multimedia file responsive to the first determining element determining that at the time period in the multimedia file beginning at the time corresponding to the identified time start point in the supplemental content the audio fingerprint of the sound track of the multimedia file does not match the identified audio fingerprint of the supplemental content; a third identifying element configured to identify a fingerprint time period in the sound track of the multimedia file where the multimedia file contains the audio fingerprint that matches the identified audio fingerprint of the supplemental content, wherein the third identifying element identifies the fingerprint time period is the sound track of the multimedia file responsive to the searching element determining that the sound track of the multimedia file contains an audio fingerprint that matches the identified audio fingerprint of the supplemental content; and a second determining element configured to determine an offset time difference between a start time of the fingerprint time period in the soundtrack of the multimedia file and the time start point in the supplemental content associated with the identified audio fingerprint, wherein the second determining element determines the offset time difference responsive to the searching element determining that the sound track of the multimedia file contains an audio fingerprint that matches the identified audio fingerprint of the supplemental content.

In another embodiment, a computer-implemented system for synchronizing supplemental content to a multimedia broadcast is provided, the system comprising: a processor; and an instruction memory storing computer readable instructions that, when executed by the processor, implement: a first obtaining element configured to obtain the multimedia broadcast, wherein the multimedia broadcast includes therein a soundtrack; a second obtaining element configured to obtain the supplemental content, wherein the supplemental content includes therein at least one audio fingerprint and wherein the audio fingerprint included in the supplemental content is associated with a time start point; a first identifying element configured to identify, in the supplemental content, the audio fingerprint; a second identifying element configured to identify, in the supplemental content, the time start point associated with the identified audio fingerprint; a first determining element configured to determine whether, at a time period in the multimedia broadcast beginning at a time corresponding to the identified time start point in the supplemental content, an audio fingerprint of the sound track of the multimedia broadcast matches the identified audio fingerprint of the supplemental content; a monitoring element configured to monitor the sound track of the multimedia broadcast as the multimedia broadcast is obtained to determine whether the sound track of the multimedia broadcast contains an audio fingerprint that matches the identified audio fingerprint of the supplemental content, wherein the monitoring element monitors the sound track of the multimedia file, wherein the monitoring element monitors the sound track of the multimedia file responsive to the first determining element determining that at the time period in the multimedia broadcast beginning at the time corresponding to the identified time start point in the supplemental content the audio fingerprint of the sound track of the multimedia broadcast does not match the identified audio fingerprint of the supplemental content; a third identifying element configured to identify a fingerprint time period in the sound track of the multimedia broadcast where the multimedia broadcast contains the audio fingerprint that matches the identified audio fingerprint of the supplemental content, wherein the third identifying element identifies the fingerprint time period responsive to the monitoring element determining that the sound track of the multimedia broadcast contains an audio fingerprint that matches the identified audio fingerprint of the supplemental content; and a second determining element configured to determine an offset time difference between a start time of the fingerprint time period in the soundtrack of the multimedia broadcast and the time start point in the supplemental content associated with the identified audio fingerprint, wherein the second determining element determines the offset time difference responsive to the monitoring element determining that the sound track of the multimedia broadcast contains an audio fingerprint that matches the identified audio fingerprint of the supplemental content.

BRIEF DESCRIPTION OF THE DRAWINGS

Various objects, features and advantages of the present invention will become apparent to one skilled in the art, in view of the following detailed description taken in combination with the attached drawings, in which:

FIG. 1 depicts two conventional captioning files.

FIGS. 5A and 5B depict a flowchart of a method according to an embodiment.

FIGS. 6A and 6B depict a flowchart of a method according to an embodiment.

DETAILED DESCRIPTION

Various mechanisms presented in this disclosure provide for dynamically adjusting the exhibition of subtitles. In one example, check-points are introduced into the subtitle file format that, once achieved by a multimedia player, provoke the rescheduling of the moment in which the texts contained in the subtitle file will be exhibited.

For the purposes of this disclosure the term "audio fingerprint" is intended to refer to information (such as an alphanumeric string) identifying a segment of audio data in a sound track.

For the purposes of this disclosure the term "multimedia file" is intended to refer to a file containing a sound track and a visual component, such visual component being, for example, video.

For the purposes of this disclosure the term "multimedia stream" is intended to refer to data comprising a sound track and a visual component, such visual component being, for example, video. In one example, such a multimedia stream may be obtained from a multimedia file.

For the purposes of this disclosure the term "multimedia broadcast" is intended to refer to a multimedia stream that is obtained from a remote source (e.g., broadcast via the Internet).

As described herein, various embodiments of the disclosure provide for two aspects: (1) the creation (or modification) of the captioning file; and (2) the playback of a multimedia file (or stream or broadcast) along with the subtitles from the captioning file.

Figure 2A:
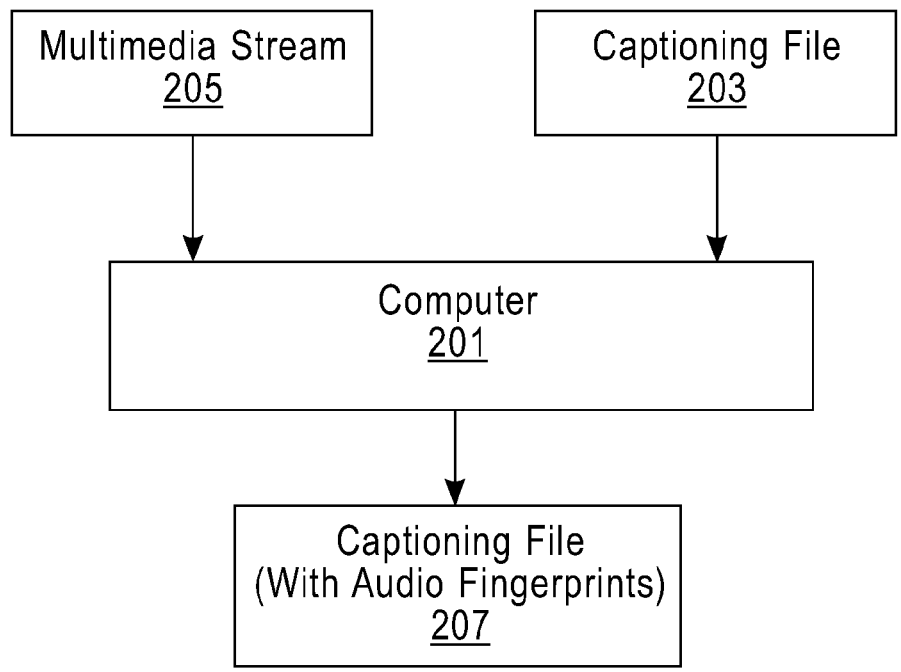
FIG. 2A depicts a block diagram of a system according to an embodiment.

Referring now to FIG. 2A, a block diagram of a system associated with modification of an existing captioning file is shown. More particularly, computer 201 (with appropriate software installed thereon (not shown)) receives captioning file 203 (including therein subtitle texts). In addition, computer 201 receives multimedia stream 205 (which may be, for example, from a multimedia file). The software generates at least one audio fingerprint (i.e., the audio signature) found at an anchor point (i.e., synchronization point) in the multimedia file (each of these will be used as a check-point). In one example, multiple audio fingerprints can be generated, in order to serve as multiple points of synchronization. The identification of each audio fingerprint and its moment of execution is annotated in the captioning file (e.g. as file meta-data). In one example, the software may receive input from a user electing the various anchor points in the multimedia file 205. In another example, the software may select the various anchor points in the multimedia file 205 as corresponding to the times in which each subtitle text in the captioning file is expected to be exhibited on the screen.

Finally, annotated captioning file 207 (with the audio fingerprint(s)) is saved and, optionally, shared (such as on the Internet). Of course, in another example, computer 201 could create a new captioning file including audio fingerprints as described above.

Figures 3, 4:
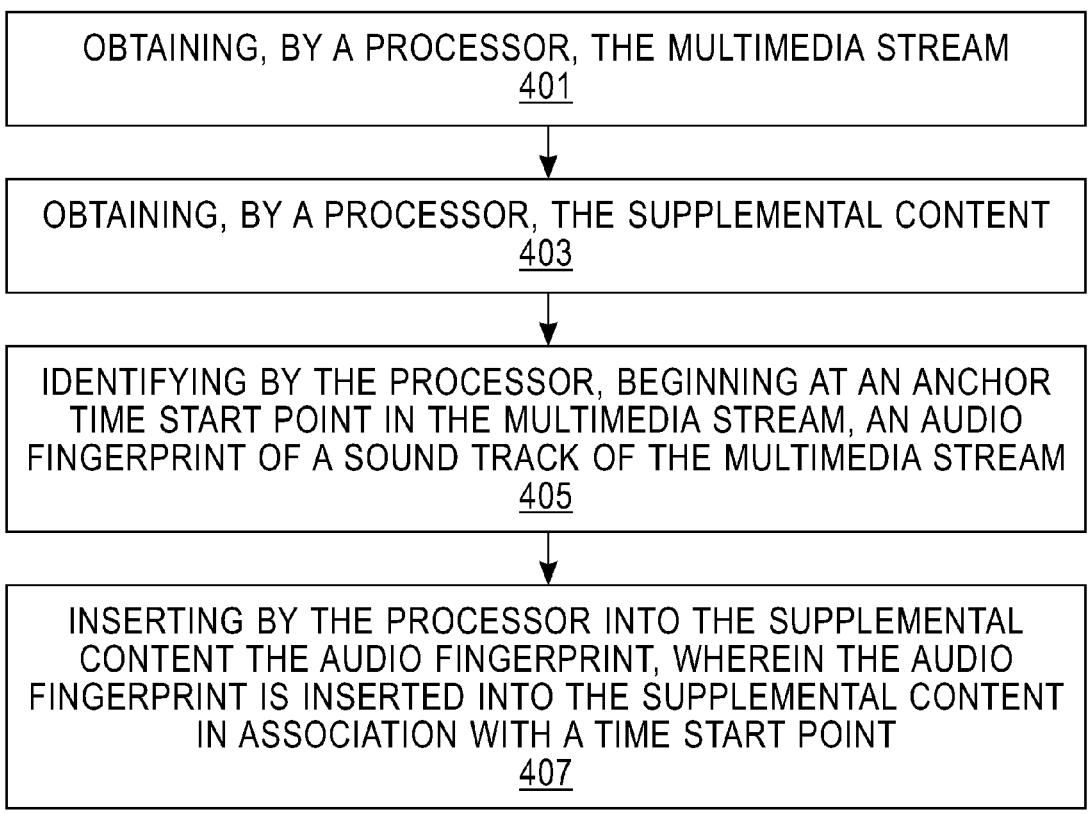
FIG. 3 depicts a captioning file according to an embodiment.
FIG. 4 depicts a flowchart of a method according to an embodiment.

FIG. 3 shows an example of annotated captioning file 301 (of the type shown in FIG. 2A as annotated captioning file 207). As seen in FIG. 3, annotated captioning file 301 includes, at line 3, an audio fingerprint (denoted in this example by string @fingerprint@).

Figure 2B:
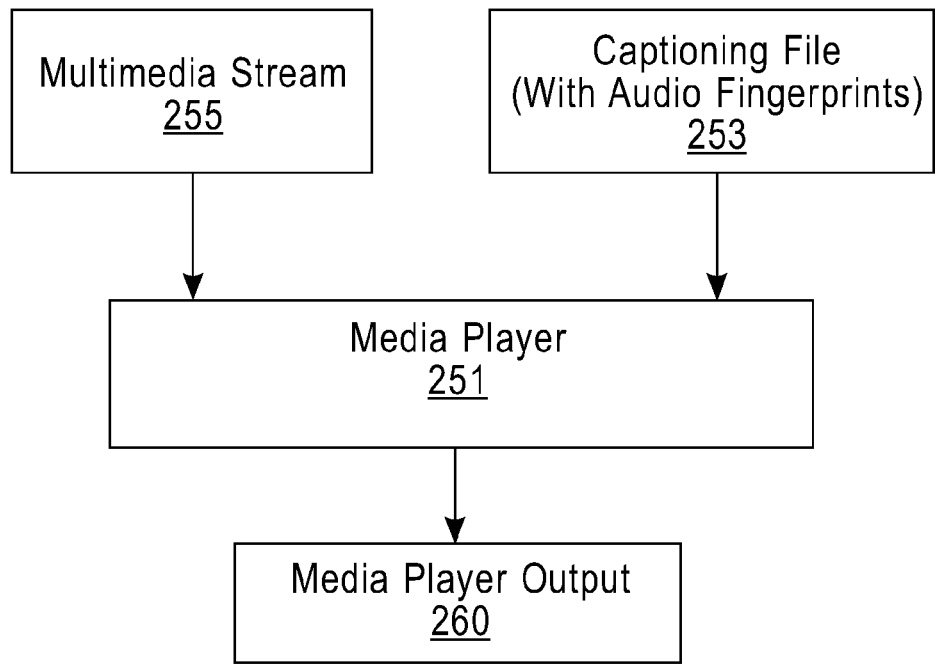
FIG. 2B depicts a block diagram of a system according to an embodiment.

Referring now to FIG. 2B, a block diagram of a system associated with playback of a multimedia stream (e.g., from a multimedia file) is shown. More particularly, the user launches a media player 251 (which may, for example, comprise software running on a computer (not shown) or a dedicated device) and opens the multimedia stream 255 along with the annotated captioning file 253 (which may be of the type shown in FIG. 2A as annotated captioning file 207 or of the type shown in FIG. 3 as annotated captioning file 301). The media player searches for audio fingerprint annotations in the annotated captioning file 253 and the expected times in which they should appear on screen. Further, the media player searches (e.g., from the beginning of the multimedia file towards the end of the multimedia file) for the times of each audio fingerprint and calculates the audio fingerprint of the multimedia file at each of these times.

If there is a match for each audio fingerprint (that is, each audio fingerprint found on the multimedia stream corresponding to each audio fingerprint found in the captioning file), then no further audio fingerprinting needs to be performed—the multimedia stream 255 and the annotated captioning file 253 are already in synchronization. The media player 251 may then provide media player output 260.

On the other hand, if there is not a match for each audio fingerprint AND the multimedia stream 255 is seekable, then the media player seeks to the beginning of the multimedia stream 255 and computes its audio fingerprints until they match the check-points annotated in the annotated captioning file 253. The annotated captioning file's timestamps are then adjusted accordingly (e.g., by propagating the difference between the originally expected exhibition time and the matching timestamps at the check-points in the multimedia stream), and the media playback starts (i.e., the media player 251 provides media player output 260).

In another example, if there is not a match for each audio fingerprint AND the multimedia stream 255 is NOT seekable (i.e. it is being broadcast), then the media player may compute the audio fingerprints until they match the annotated captioning file's or until a timeout is exceeded (while the media player 251 provides media player output 260).

In another example, a matching between an audio fingerprint in a multimedia stream and an audio fingerprint in a captioning file may be a 100% match. In another example, a matching between an audio fingerprint in a multimedia stream and an audio fingerprint in a captioning file may be less than a 100% match (e.g. above a certain threshold). Such less than 100% match may be applicable, for example, when the original audio is re-encoded with different settings (resulting in a slight change in the audio fingerprint).

Referring now to FIG. 4, in another embodiment a computer-implemented method for synchronizing supplemental content to a multimedia stream is shown. As seen in this FIG. 4, the method of this embodiment comprises: at 401—obtaining, by a processor, the multimedia stream; at 403—obtaining, by the processor, the supplemental content; at 405—identifying by the processor, beginning at an anchor time start point in the multimedia stream, an audio fingerprint of a sound track of the multimedia stream; and at 407—inserting by the processor into the supplemental content the audio fingerprint, wherein the audio fingerprint is inserted into the supplemental content in association with a time start point.

Figure 5A:
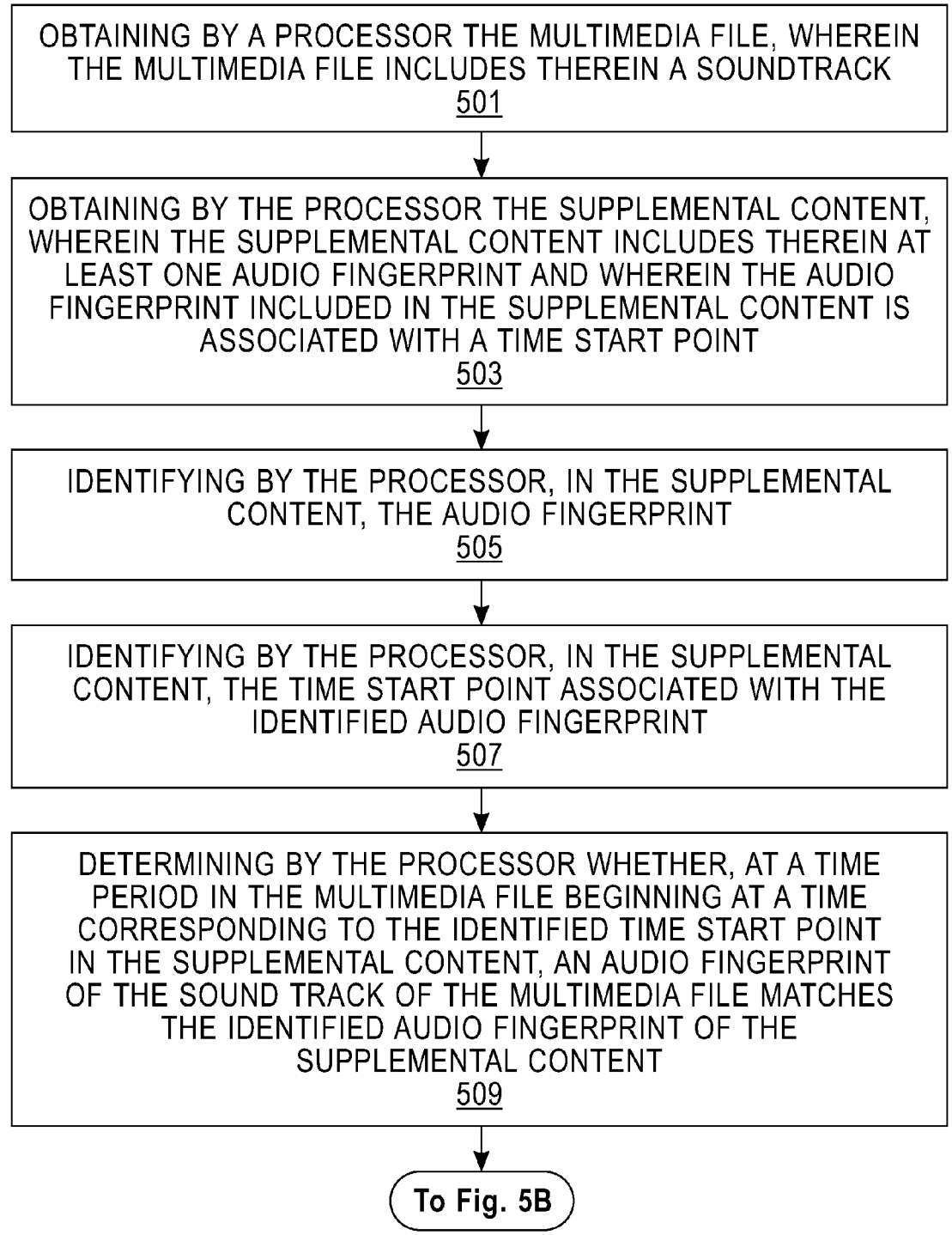

Referring now to FIGS. 5A and 5B, in another embodiment a computer-implemented method for synchronizing supplemental content to a multimedia file is shown. As seen in these FIGS. 5A and 5B, the method of this embodiment comprises: at 501—obtaining by a processor the multimedia file, wherein the multimedia file includes therein a soundtrack; at 503—obtaining by the processor the supplemental content, wherein the supplemental content includes therein at least one audio fingerprint and wherein the audio fingerprint included in the supplemental content is associated with a time start point; at 505—identifying by the processor, in the supplemental content, the audio fingerprint; at 507—identifying by the processor, in the supplemental content, the time start point associated with the identified audio fingerprint; at 509—determining by the processor whether, at a time period in the multimedia file beginning at a time corresponding to the identified time start point in the supplemental content, an audio fingerprint of the sound track of the multimedia file matches the identified audio fingerprint of the supplemental content; at 511—responsive to determining that at the time period in the multimedia file beginning at the time corresponding to the identified time start point in the supplemental content the audio fingerprint of the sound track of the multimedia file does not match the identified audio fingerprint of the supplemental content: searching, by the processor, the sound track of the multimedia file from a beginning of the multimedia file towards an end of the multimedia file to determine whether the sound track of the multimedia file contains an audio fingerprint that matches the identified audio fingerprint of the supplemental content; and at 513—responsive to determining that the sound track of the multimedia file contains an audio fingerprint that matches the identified audio fingerprint of the supplemental content: identifying, by the processor, a fingerprint time period in the sound track of the multimedia file where the multimedia file contains the audio fingerprint that matches the identified audio fingerprint of the supplemental content; and determining, by the processor, an offset time difference between a start time of the fingerprint time period in the soundtrack of the multimedia file and the time start point in the supplemental content associated with the identified audio fingerprint.

Referring now to FIGS. 6A and 6B, in another embodiment a computer-implemented method for synchronizing supplemental content to a multimedia broadcast is shown. As seen in these FIGS. 6A and 6B, the method of this embodiment comprises: at 601—obtaining by a processor the multimedia broadcast, wherein the multimedia broadcast includes therein a soundtrack; at 603—obtaining by the processor the supplemental content, wherein the supplemental content includes therein at least one audio fingerprint and wherein the audio fingerprint included in the supplemental content is associated with a time start point; at 605—identifying by the processor, in the supplemental content, the audio fingerprint; at 607—identifying by the processor, in the supplemental content, the time start point associated with the identified audio fingerprint; at 609—determining by the processor whether, at a time period in the multimedia broadcast beginning at a time corresponding to the identified time start point in the supplemental content, an audio fingerprint of the sound track of the multimedia broadcast matches the identified audio fingerprint of the supplemental content; at 611—responsive to determining that at the time period in the multimedia broadcast beginning at the time corresponding to the identified time start point in the supplemental content the audio fingerprint of the sound track of the multimedia broadcast does not match the identified audio fingerprint of the supplemental content: monitoring, by the processor, the sound track of the multimedia broadcast as the multimedia broadcast is obtained to determine whether the sound track of the multimedia broadcast contains an audio fingerprint that matches the identified audio fingerprint of the supplemental content; and at 613—responsive to determining that the sound track of the multimedia broadcast contains an audio fingerprint that matches the identified audio fingerprint of the supplemental content: identifying, by the processor, a fingerprint time period in the sound track of the multimedia broadcast where the multimedia broadcast contains the audio fingerprint that matches the identified audio fingerprint of the supplemental content; and determining, by the processor, an offset time difference between a start time of the fingerprint time period in the soundtrack of the multimedia broadcast and the time start point in the supplemental content associated with the identified audio fingerprint.

Figure 7:
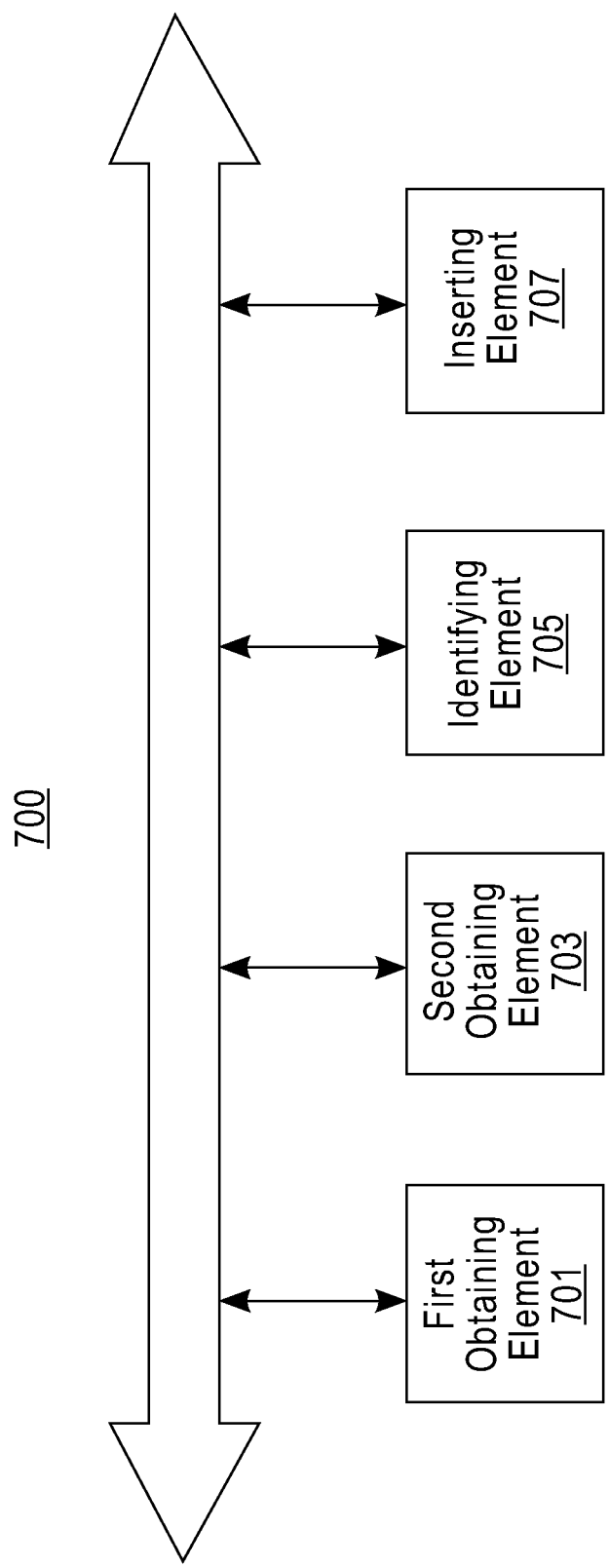
FIG. 7 depicts a block diagram of a system according to an embodiment.

Referring now to FIG. 7, in another embodiment, a system 700 for synchronizing supplemental content to a multimedia stream is provided. The system may include a processor (not shown) and an instruction memory (not shown) storing computer readable instructions that, when executed by the processor, implement: a first obtaining element 701 configured to obtain the multimedia stream; a second obtaining element 703 configured to obtain the supplemental content; an identifying element 705 configured to identify, beginning at an anchor time start point in the multimedia stream, an audio fingerprint of a sound track of the multimedia stream; and an inserting element 707 configured to insert into the supplemental content the audio fingerprint, wherein the audio fingerprint is inserted into the supplemental content in association with a time start point.

In one example, communication between and among the various components of FIG. 7 may be bi-directional. In another example, the communication may be carried out via the Internet, an intranet, a local area network, a wide area network and/or any other desired communication channel(s). In another example, each of the components may be operatively connected to each of the other components. In another example, some or all of these components may be implemented in a computer system of the type shown in FIG. 10.

Figure 8:
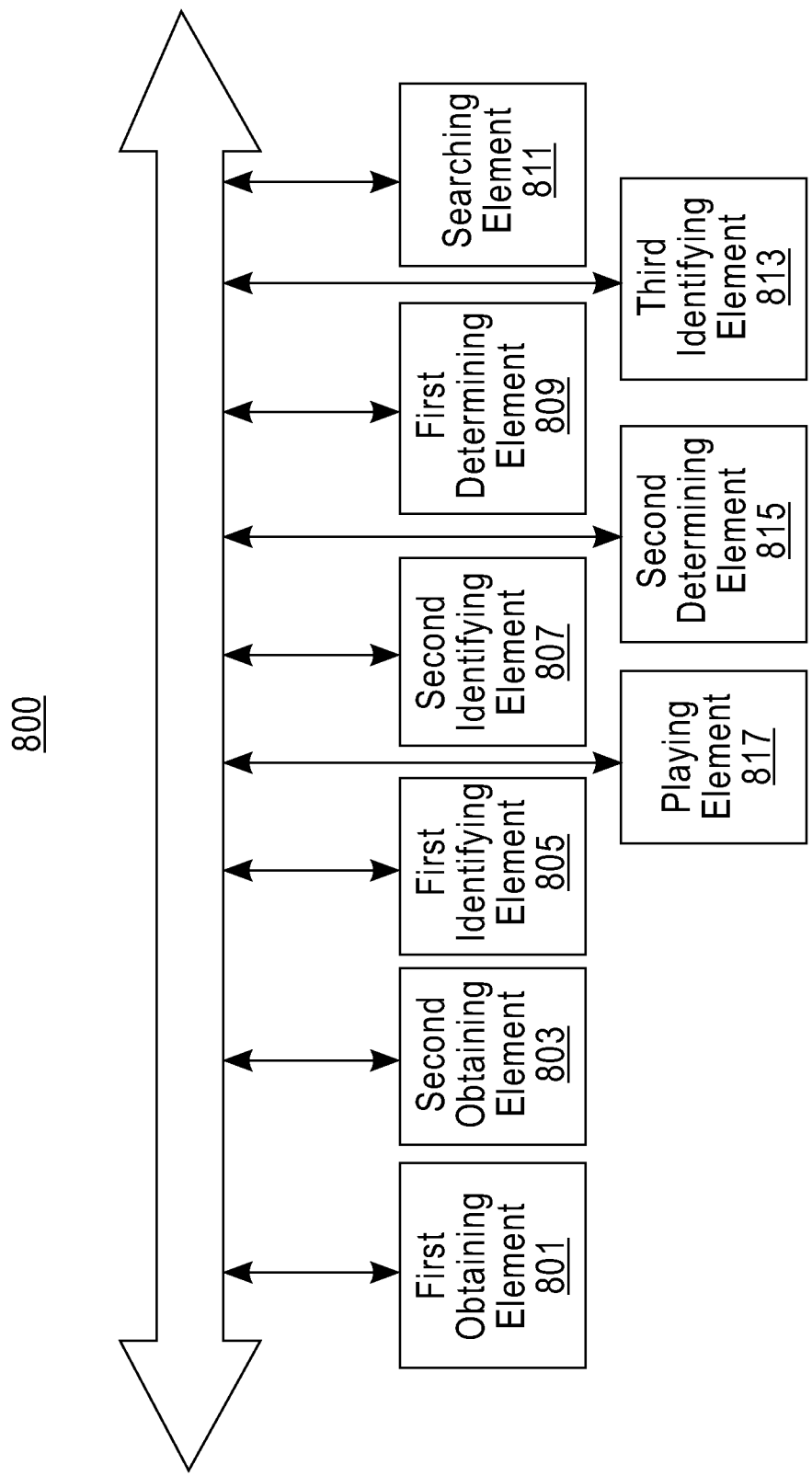
FIG. 8 depicts a block diagram of a system according to an embodiment.

Referring now to FIG. 8, in another embodiment, a system 800 for synchronizing supplemental content to a multimedia file is provided. The system may include a processor (not shown) and an instruction memory (not shown) storing computer readable instructions that, when executed by the processor, implement: a first obtaining element 801 configured to obtain the multimedia file, wherein the multimedia file includes therein a soundtrack; a second obtaining element 803 configured to obtain the supplemental content, wherein the supplemental content includes therein at least one audio fingerprint and wherein the audio fingerprint included in the supplemental content is associated with a time start point; a first identifying element 805 configured to identify, in the supplemental content, the audio fingerprint; a second identifying element 807 configured to identify, in the supplemental content, the time start point associated with the identified audio fingerprint; a first determining element 809 configured to determine whether, at a time period in the multimedia file beginning at a time corresponding to the identified time start point in the supplemental content, an audio fingerprint of the sound track of the multimedia file matches the identified audio fingerprint of the supplemental content; a searching element 811 configured to search the sound track of the multimedia file from a beginning of the multimedia file towards an end of the multimedia file to determine whether the sound track of the multimedia file contains an audio fingerprint that matches the identified audio fingerprint of the supplemental content, wherein the searching element searches the sound track of the multimedia file responsive to the first determining element determining that at the time period in the multimedia file beginning at the time corresponding to the identified time start point in the supplemental content the audio fingerprint of the sound track of the multimedia file does not match the identified audio fingerprint of the supplemental content; a third identifying element 813 configured to identify a fingerprint time period in the sound track of the multimedia file where the multimedia file contains the audio fingerprint that matches the identified audio fingerprint of the supplemental content, wherein the third identifying element identifies the fingerprint time period is the sound track of the multimedia file responsive to the searching element determining that the sound track of the multimedia file contains an audio fingerprint that matches the identified audio fingerprint of the supplemental content; and a second determining element 815 configured to determine an offset time difference between a start time of the fingerprint time period in the soundtrack of the multimedia file and the time start point in the supplemental content associated with the identified audio fingerprint, wherein the second determining element determines the offset time difference responsive to the searching element determining that the sound track of the multimedia file contains an audio fingerprint that matches the identified audio fingerprint of the supplemental content. In addition, the instructions, when executed by the processor, may further implement a playing element 817 configured to play the multimedia file and the supplemental content.

In one example, communication between and among the various components of FIG. 8 may be bi-directional. In another example, the communication may be carried out via the Internet, an intranet, a local area network, a wide area network and/or any other desired communication channel(s). In another example, each of the components may be operatively connected to each of the other components. In another example, some or all of these components may be implemented in a computer system of the type shown in FIG. 10.

Figure 9:
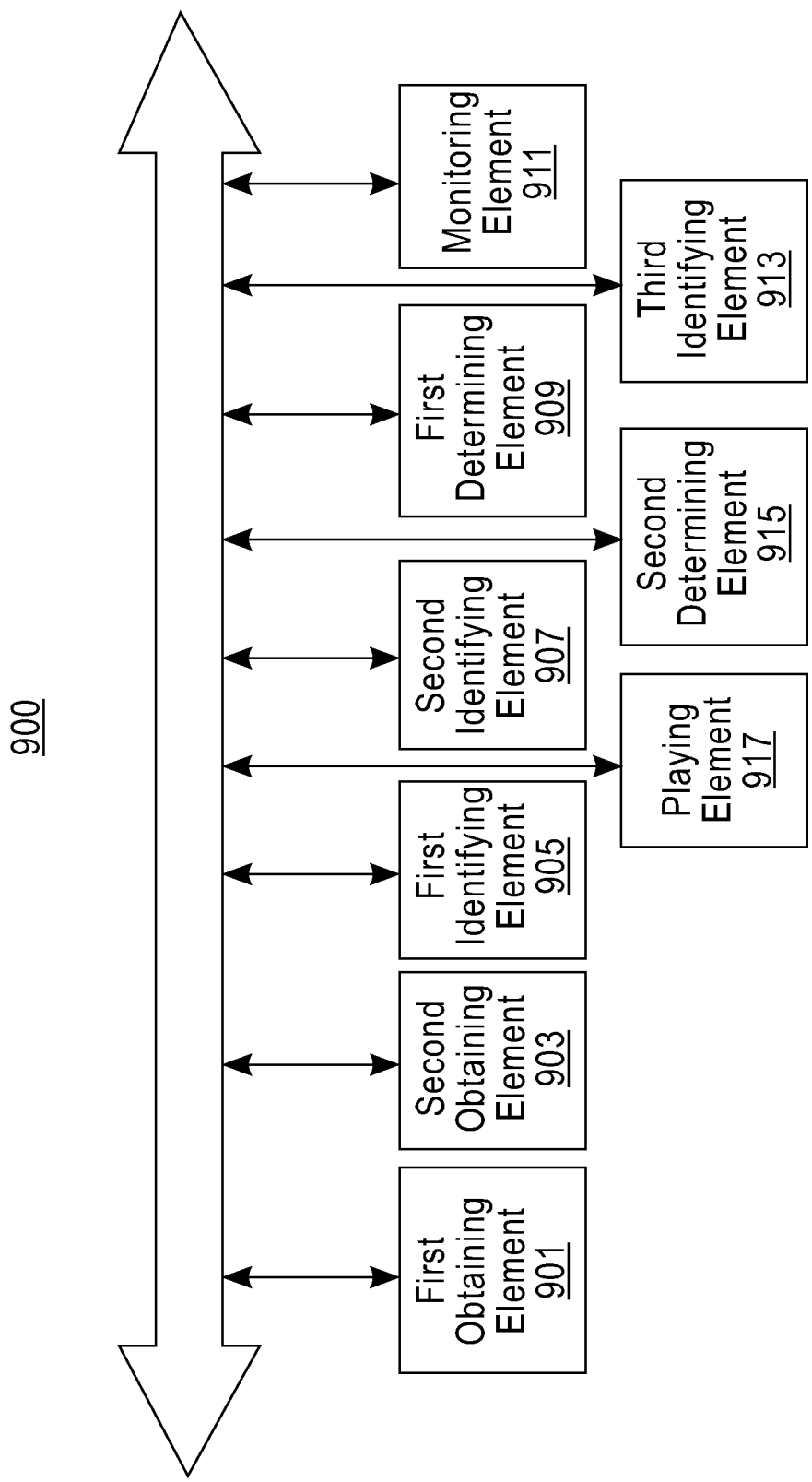
FIG. 9 depicts a block diagram of a system according to an embodiment.

Referring now to FIG. 9, in another embodiment, a system 900 for synchronizing supplemental content to a multimedia broadcast is provided. The system may include a processor (not shown) and an instruction memory (not shown) storing computer readable instructions that, when executed by the processor, implement: a first obtaining element 901 configured to obtain the multimedia broadcast, wherein the multimedia broadcast includes therein a soundtrack; a second obtaining element 903 configured to obtain the supplemental content, wherein the supplemental content includes therein at least one audio fingerprint and wherein the audio fingerprint included in the supplemental content is associated with a time start point; a first identifying element 905 configured to identify, in the supplemental content, the audio fingerprint; a second identifying element 907 configured to identify, in the supplemental content, the time start point associated with the identified audio fingerprint; a first determining element 909 configured to determine whether, at a time period in the multimedia broadcast beginning at a time corresponding to the identified time start point in the supplemental content, an audio fingerprint of the sound track of the multimedia broadcast matches the identified audio fingerprint of the supplemental content; a monitoring element 911 configured to monitor the sound track of the multimedia broadcast as the multimedia broadcast is obtained to determine whether the sound track of the multimedia broadcast contains an audio fingerprint that matches the identified audio fingerprint of the supplemental content, wherein the monitoring element monitors the sound track of the multimedia file, wherein the monitoring element monitors the sound track of the multimedia file responsive to the first determining element determining that at the time period in the multimedia broadcast beginning at the time corresponding to the identified time start point in the supplemental content the audio fingerprint of the sound track of the multimedia broadcast does not match the identified audio fingerprint of the supplemental content; a third identifying element 913 configured to identify a fingerprint time period in the sound track of the multimedia broadcast where the multimedia broadcast contains the audio fingerprint that matches the identified audio fingerprint of the supplemental content, wherein the third identifying element identifies the fingerprint time period responsive to the monitoring element determining that the sound track of the multimedia broadcast contains an audio fingerprint that matches the identified audio fingerprint of the supplemental content; and a third determining element 915 configured to determine an offset time difference between a start time of the fingerprint time period in the soundtrack of the multimedia broadcast and the time start point in the supplemental content associated with the identified audio fingerprint, wherein the second determining element determines the offset time difference responsive to the monitoring element determining that the sound track of the multimedia broadcast contains an audio fingerprint that matches the identified audio fingerprint of the supplemental content. In addition, the instructions, when executed by the processor, may further implement a playing element 917 configured to play the supplemental content as the multimedia broadcast is obtained.

In one example, communication between and among the various components of FIG. 9 may be bi-directional. In another example, the communication may be carried out via the Internet, an intranet, a local area network, a wide area network and/or any other desired communication channel(s). In another example, each of the components may be operatively connected to each of the other components. In another example, some or all of these components may be implemented in a computer system of the type shown in FIG. 10.

Figure 10:
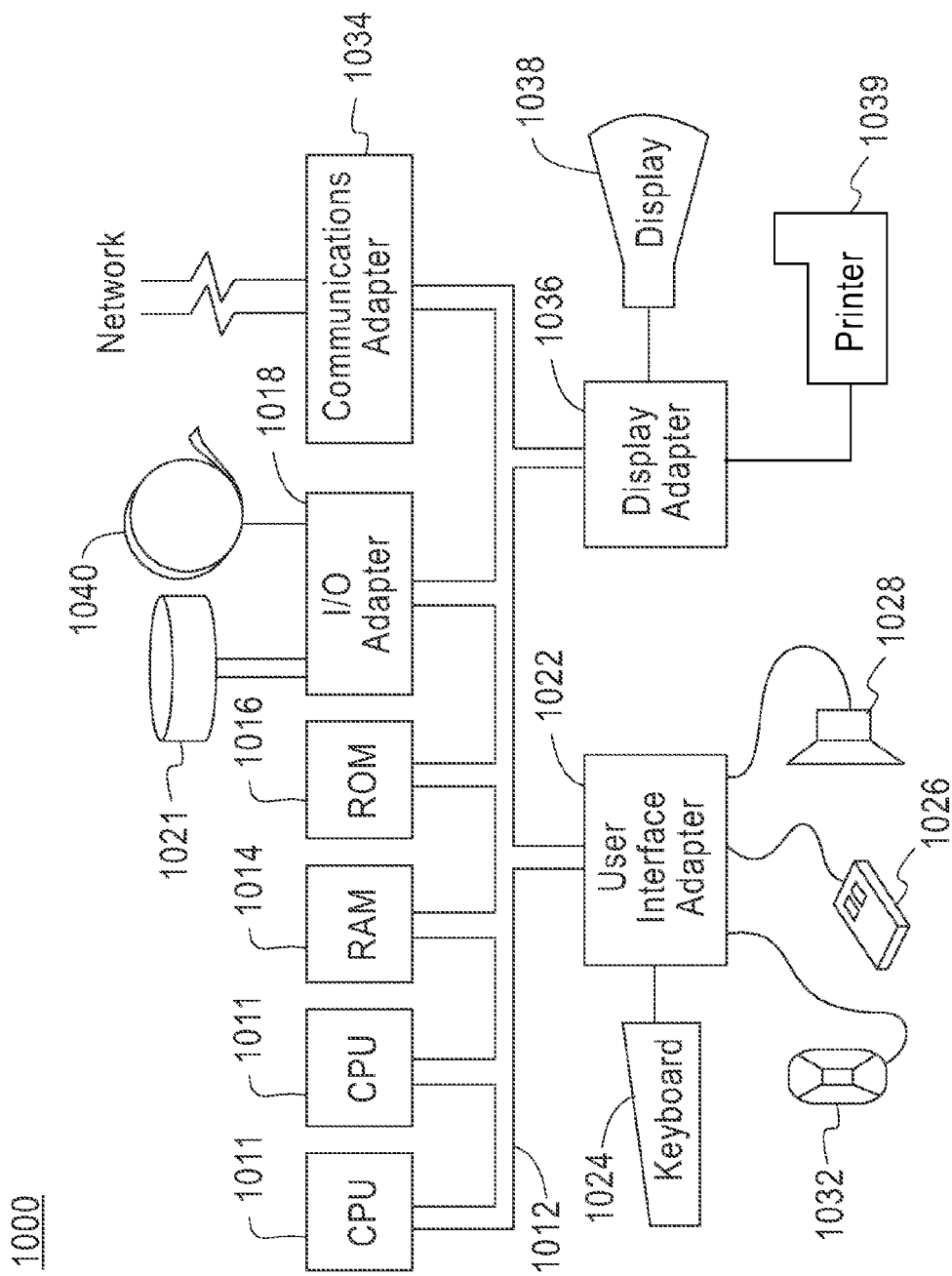
FIG. 10 depicts a block diagram of a system according to an embodiment.

Referring now to FIG. 10, this figure shows a hardware configuration of computing system 1000 according to an embodiment of the present invention. As seen, this hardware configuration has at least one processor or central processing unit (CPU) 1011. The CPUs 1011 are interconnected via a system bus 1012 to a random access memory (RAM) 1014, read-only memory (ROM) 1016, input/output (I/O) adapter 1018 (for connecting peripheral devices such as disk units 1021 and tape drives 1040 to the bus 1012), user interface adapter 1022 (for connecting a keyboard 1024, mouse 1026, speaker 1028, microphone 1032, and/or other user interface device to the bus 1012), a communications adapter 1034 for connecting the system 1000 to a data processing network, the Internet, an Intranet, a local area network (LAN), etc., and a display adapter 1036 for connecting the bus 1012 to a display device 1038 and/or printer 1039 (e.g., a digital printer or the like).

In one embodiment, a computer-implemented method for synchronizing supplemental content to a multimedia stream is provided, the method comprising: obtaining, by a processor, the multimedia stream; obtaining, by the processor, the supplemental content; identifying by the processor, beginning at an anchor time start point in the multimedia stream, an audio fingerprint of a sound track of the multimedia stream; and inserting by the processor into the supplemental content the audio fingerprint, wherein the audio fingerprint is inserted into the supplemental content in association with a time start point.

In one example, the method further comprises: identifying by the processor, beginning at each of a plurality of anchor time points in the multimedia stream, a corresponding audio fingerprint of the sound track of the multimedia stream; and inserting by the processor into the supplemental content the plurality of audio fingerprints, wherein each audio fingerprint is inserted into the supplemental content in association with a respective time start point.

In another example, the multimedia stream comprises one of: (a) a broadcast; (b) a multimedia file; (c) a television program; and (d) a movie.

In another example, the supplemental content comprises one of: (a) captions in the language of the sound track of the multimedia stream; (b) captions in a language different from the language of the sound track of the multimedia stream; and (c) a combination thereof.

In another example, the supplemental content is in the form of a file.

In another example, the time start point associated with the audio fingerprint in the supplemental content is a time start point of a text entry in the supplemental content.

In another example, each time start point associated with each respective audio fingerprint in the supplemental content is a time start point of a respective text entry in the supplemental content.

In another embodiment, a computer-implemented method for synchronizing supplemental content to a multimedia file is provided, the method comprising: obtaining by a processor the multimedia file, wherein the multimedia file includes therein a soundtrack; obtaining by the processor the supplemental content, wherein the supplemental content includes therein at least one audio fingerprint and wherein the audio fingerprint included in the supplemental content is associated with a time start point; identifying by the processor, in the supplemental content, the audio fingerprint; identifying by the processor, in the supplemental content, the time start point associated with the identified audio fingerprint; determining by the processor whether, at a time period in the multimedia file beginning at a time corresponding to the identified time start point in the supplemental content, an audio fingerprint of the sound track of the multimedia file matches the identified audio fingerprint of the supplemental content; responsive to determining that at the time period in the multimedia file beginning at the time corresponding to the identified time start point in the supplemental content the audio fingerprint of the sound track of the multimedia file does not match the identified audio fingerprint of the supplemental content: searching, by the processor, the sound track of the multimedia file from a beginning of the multimedia file towards an end of the multimedia file to determine whether the sound track of the multimedia file contains an audio fingerprint that matches the identified audio fingerprint of the supplemental content; and responsive to determining that the sound track of the multimedia file contains an audio fingerprint that matches the identified audio fingerprint of the supplemental content: identifying, by the processor, a fingerprint time period in the sound track of the multimedia file where the multimedia file contains the audio fingerprint that matches the identified audio fingerprint of the supplemental content; and determining, by the processor, an offset time difference between a start time of the fingerprint time period in the soundtrack of the multimedia file and the time start point in the supplemental content associated with the identified audio fingerprint.

In another example, the method further comprises playing, by the processor, the multimedia file and the supplemental content.

In another example, the time start point associated with the audio fingerprint in the supplemental content is a time start point of a text entry in the supplemental content.

In another example, during playing of the multimedia file and the supplemental content, the text entry in the supplement content is displayed at a timing that is corrected based upon the offset time difference.

In another example, the multimedia file comprises one of: (a) a video clip; (b) a television program; and (c) a movie.

In another example, the supplemental content comprises one of: (a) captions in the language of the sound track of the multimedia file; (b) captions in a language different from the language of the sound track of the multimedia file; (c) a sound track different from the sound track of the multimedia file; and (d) a combination thereof.

In another example, the supplemental content is in the form of a file.

In another example, the supplemental content includes therein a plurality of audio fingerprints and wherein each audio fingerprint included in the supplemental content is associated with a respective time start point.

In another embodiment, a computer-implemented method for synchronizing supplemental content to a multimedia broadcast is provided, the method comprising: obtaining by a processor the multimedia broadcast, wherein the multimedia broadcast includes therein a soundtrack; obtaining by the processor the supplemental content, wherein the supplemental content includes therein at least one audio fingerprint and wherein the audio fingerprint included in the supplemental content is associated with a time start point; identifying by the processor, in the supplemental content, the audio fingerprint; identifying by the processor, in the supplemental content, the time start point associated with the identified audio fingerprint; determining by the processor whether, at a time period in the multimedia broadcast beginning at a time corresponding to the identified time start point in the supplemental content, an audio fingerprint of the sound track of the multimedia broadcast matches the identified audio fingerprint of the supplemental content; responsive to determining that at the time period in the multimedia broadcast beginning at the time corresponding to the identified time start point in the supplemental content the audio fingerprint of the sound track of the multimedia broadcast does not match the identified audio fingerprint of the supplemental content: monitoring, by the processor, the sound track of the multimedia broadcast as the multimedia broadcast is obtained to determine whether the sound track of the multimedia broadcast contains an audio fingerprint that matches the identified audio fingerprint of the supplemental content; and responsive to determining that the sound track of the multimedia broadcast contains an audio fingerprint that matches the identified audio fingerprint of the supplemental content: identifying, by the processor, a fingerprint time period in the sound track of the multimedia broadcast where the multimedia broadcast contains the audio fingerprint that matches the identified audio fingerprint of the supplemental content; and determining, by the processor, an offset time difference between a start time of the fingerprint time period in the soundtrack of the multimedia broadcast and the time start point in the supplemental content associated with the identified audio fingerprint.

In one example, the method further comprises playing, by the processor, the supplemental content as the multimedia broadcast is obtained.

In another example, the time start point associated with the audio fingerprint in the supplemental content is a time start point of a text entry in the supplemental content.

In another example, during playing of the supplemental content as the multimedia broadcast is obtained, the text entry in the supplement content is displayed at a timing that is corrected based upon the offset time difference.

In another example, the supplemental content includes therein a plurality of audio fingerprints and wherein each audio fingerprint included in the supplemental content is associated with a respective time start point.

In another embodiment, a computer readable storage medium, tangibly embodying a program of instructions executable by the computer for synchronizing supplemental content to a multimedia stream is provided, the program of instructions, when executing, performing the following steps: obtaining the multimedia stream; obtaining the supplemental content; identifying, beginning at an anchor time start point in the multimedia stream, an audio fingerprint of a sound track of the multimedia stream; and inserting into the supplemental content the audio fingerprint, wherein the audio fingerprint is inserted into the supplemental content in association with a time start point.

In one example, the program of instructions, when executing, further performs the following steps: identifying by the processor, beginning at each of a plurality of anchor time points in the multimedia stream, a corresponding audio fingerprint of the sound track of the multimedia stream; and inserting by the processor into the supplemental content the plurality of audio fingerprints, wherein each audio fingerprint is inserted into the supplemental content in association with respective time start point.

In another example, the multimedia stream comprises one of: (a) a broadcast; (b) a multimedia file; (c) a television program; and (d) a movie.

In another example, the supplemental content comprises one of: (a) captions in the language of the sound track of the multimedia stream; (b) captions in a language different from the language of the sound track of the multimedia stream; (c) a sound track different from the sound track of the multimedia stream; and (d) a combination thereof.

In another example, the supplemental content is in the form of a file.

In another example, the time start point associated with the audio fingerprint in the supplemental content is a time start point of a text entry in the supplemental content.

In another example, each time start point associated with each respective audio fingerprint in the supplemental content is a time start point of a respective text entry in the supplemental content.

In another embodiment, a computer readable storage medium, tangibly embodying a program of instructions executable by the computer for synchronizing supplemental content to a multimedia file is provided, the program of instructions, when executing, performing the following steps: obtaining the multimedia file, wherein the multimedia file includes therein a soundtrack; obtaining the supplemental content, wherein the supplemental content includes therein at least one audio fingerprint and wherein the audio fingerprint included in the supplemental content is associated with a time start point; identifying, in the supplemental content, the audio fingerprint; identifying, in the supplemental content, the time start point associated with the identified audio fingerprint; determining whether, at a time period in the multimedia file beginning at a time corresponding to the identified time start point in the supplemental content, an audio fingerprint of the sound track of the multimedia file matches the identified audio fingerprint of the supplemental content; responsive to determining that at the time period in the multimedia file beginning at the time corresponding to the identified time start point in the supplemental content the audio fingerprint of the sound track of the multimedia file does not match the identified audio fingerprint of the supplemental content: searching the sound track of the multimedia file from a beginning of the multimedia file towards an end of the multimedia file to determine whether the sound track of the multimedia file contains an audio fingerprint that matches the identified audio fingerprint of the supplemental content; and responsive to determining that the sound track of the multimedia file contains an audio fingerprint that matches the identified audio fingerprint of the supplemental content: identifying a fingerprint time period in the sound track of the multimedia file where the multimedia file contains the audio fingerprint that matches the identified audio fingerprint of the supplemental content; and determining an offset time difference between a start time of the fingerprint time period in the soundtrack of the multimedia file and the time start point in the supplemental content associated with the identified audio fingerprint.

In one example, the program of instructions, when executing, further performs playing the multimedia file and the supplemental content.

In another example, the time start point associated with the audio fingerprint in the supplemental content is a time start point of a text entry in the supplemental content.

In another example, during playing of the multimedia file and the supplemental content, the text entry in the supplement content is displayed at a timing that is corrected based upon the offset time difference.

In another example, the multimedia file comprises one of: (a) a video clip; (b) a television program; and (c) a movie.

In another example, the supplemental content comprises one of: (a) captions in the language of the sound track of the multimedia file; (b) captions in a language different from the language of the sound track of the multimedia file; (c) a sound track different from the sound track of the multimedia file; and (d) a combination thereof.

In another example, the supplemental content is in the form of a file.

In another example, the supplemental content includes therein a plurality of audio fingerprints and wherein each audio fingerprint included in the supplemental content is associated with a respective time start point.

In another embodiment, a computer readable storage medium, tangibly embodying a program of instructions executable by the computer for synchronizing supplemental content to a multimedia broadcast is provided, the program of instructions, when executing, performing the following steps: obtaining the multimedia broadcast, wherein the multimedia broadcast includes therein a soundtrack; obtaining the supplemental content, wherein the supplemental content includes therein at least one audio fingerprint and wherein the audio fingerprint included in the supplemental content is associated with a time start point; identifying, in the supplemental content, the audio fingerprint; identifying, in the supplemental content, the time start point associated with the identified audio fingerprint; determining whether, at a time period in the multimedia broadcast beginning at a time corresponding to the identified time start point in the supplemental content, an audio fingerprint of the sound track of the multimedia broadcast matches the identified audio fingerprint of the supplemental content; responsive to determining that at the time period in the multimedia broadcast beginning at the time corresponding to the identified time start point in the supplemental content the audio fingerprint of the sound track of the multimedia broadcast does not match the identified audio fingerprint of the supplemental content: monitoring the sound track of the multimedia broadcast as the multimedia broadcast is obtained to determine whether the sound track of the multimedia broadcast contains an audio fingerprint that matches the identified audio fingerprint of the supplemental content; and responsive to determining that the sound track of the multimedia broadcast contains an audio fingerprint that matches the identified audio fingerprint of the supplemental content: identifying a fingerprint time period in the sound track of the multimedia broadcast where the multimedia broadcast contains the audio fingerprint that matches the identified audio fingerprint of the supplemental content; and determining an offset time difference between a start time of the fingerprint time period in the soundtrack of the multimedia broadcast and the time start point in the supplemental content associated with the identified audio fingerprint.

In one example, the program of instructions, when executing, further performs playing the supplemental content as the multimedia broadcast is obtained.

In another example, the time start point associated with the audio fingerprint in the supplemental content is a time start point of a text entry in the supplemental content.

In another example, during playing of the supplemental content as the multimedia broadcast is obtained, the text entry in the supplement content is displayed at a timing that is corrected based upon the offset time difference.

In another example, the supplemental content includes therein a plurality of audio fingerprints and wherein each audio fingerprint included in the supplemental content is associated with a respective time start point.

In another embodiment, a computer-implemented system for synchronizing supplemental content to a multimedia stream is provided, the system comprising: a processor; and an instruction memory storing computer readable instructions that, when executed by the processor, implement: a first obtaining element configured to obtain the multimedia stream; a second obtaining element configured to obtain the supplemental content; an identifying element configured to identify, beginning at an anchor time start point in the multimedia stream, an audio fingerprint of a sound track of the multimedia stream; and an inserting element configured to insert into the supplemental content the audio fingerprint, wherein the audio fingerprint is inserted into the supplemental content in association with a time start point.

In one example: the identifying element is configured to identify, beginning at each of a plurality of anchor time points in the multimedia stream, a corresponding audio fingerprint of the sound track of the multimedia stream; and the inserting element is configured to insert into the supplemental content the plurality of audio fingerprints, wherein each audio fingerprint is inserted into the supplemental content in association with respective time start point.

In another example, the multimedia stream comprises one of: (a) a broadcast; (b) a multimedia file; (c) a television program; and (d) a movie.

In another example, the supplemental content comprises one of: (a) captions in the language of the sound track of the multimedia stream; (b) captions in a language different from the language of the sound track of the multimedia stream; (c) a sound track different from the sound track of the multimedia stream; and (d) a combination thereof.

In another example, the supplemental content is in the form of a file.

In another example, the time start point associated with the audio fingerprint in the supplemental content is a time start point of a text entry in the supplemental content.

In another example, each time start point associated with each respective audio fingerprint in the supplemental content is a time start point of a respective text entry in the supplemental content.

In another embodiment, a computer-implemented system for synchronizing supplemental content to a multimedia file is provided, the system comprising: a processor; and an instruction memory storing computer readable instructions that, when executed by the processor, implement: a first obtaining element configured to obtain the multimedia file, wherein the multimedia file includes therein a soundtrack; a second obtaining element configured to obtain the supplemental content, wherein the supplemental content includes therein at least one audio fingerprint and wherein the audio fingerprint included in the supplemental content is associated with a time start point; a first identifying element configured to identify, in the supplemental content, the audio fingerprint; a second identifying element configured to identify, in the supplemental content, the time start point associated with the identified audio fingerprint; a first determining element configured to determine whether, at a time period in the multimedia file beginning at a time corresponding to the identified time start point in the supplemental content, an audio fingerprint of the sound track of the multimedia file matches the identified audio fingerprint of the supplemental content; a searching element configured to search the sound track of the multimedia file from a beginning of the multimedia file towards an end of the multimedia file to determine whether the sound track of the multimedia file contains an audio fingerprint that matches the identified audio fingerprint of the supplemental content, wherein the searching element searches the sound track of the multimedia file responsive to the first determining element determining that at the time period in the multimedia file beginning at the time corresponding to the identified time start point in the supplemental content the audio fingerprint of the sound track of the multimedia file does not match the identified audio fingerprint of the supplemental content; a third identifying element configured to identify a fingerprint time period in the sound track of the multimedia file where the multimedia file contains the audio fingerprint that matches the identified audio fingerprint of the supplemental content, wherein the third identifying element identifies the fingerprint time period is the sound track of the multimedia file responsive to the searching element determining that the sound track of the multimedia file contains an audio fingerprint that matches the identified audio fingerprint of the supplemental content; and a second determining element configured to determine an offset time difference between a start time of the fingerprint time period in the soundtrack of the multimedia file and the time start point in the supplemental content associated with the identified audio fingerprint, wherein the second determining element determines the offset time difference responsive to the searching element determining that the sound track of the multimedia file contains an audio fingerprint that matches the identified audio fingerprint of the supplemental content.

In one example, the instructions, when executed by the processor, implement a playing element configured to play the multimedia file and the supplemental content.

In another example, the time start point associated with the audio fingerprint in the supplemental content is a time start point of a text entry in the supplemental content.

In another example, during playing of the multimedia file and the supplemental content, the text entry in the supplement content is displayed at a timing that is corrected based upon the offset time difference.

In another example, the multimedia file comprises one of: (a) a video clip; (b) a television program; and (c) a movie.

In another example, the supplemental content comprises one of: (a) captions in the language of the sound track of the multimedia file; (b) captions in a language different from the language of the sound track of the multimedia file; (c) a sound track different from the sound track of the multimedia file; and (d) a combination thereof.

In another example, the supplemental content is in the form of a file.

In another example, the supplemental content includes therein a plurality of audio fingerprints and wherein each audio fingerprint included in the supplemental content is associated with a respective time start point.

In another embodiment, a computer-implemented system for synchronizing supplemental content to a multimedia broadcast is provided, the system comprising: a processor; and an instruction memory storing computer readable instructions that, when executed by the processor, implement: a first obtaining element configured to obtain the multimedia broadcast, wherein the multimedia broadcast includes therein a soundtrack; a second obtaining element configured to obtain the supplemental content, wherein the supplemental content includes therein at least one audio fingerprint and wherein the audio fingerprint included in the supplemental content is associated with a time start point; a first identifying element configured to identify, in the supplemental content, the audio fingerprint; a second identifying element configured to identify, in the supplemental content, the time start point associated with the identified audio fingerprint; a first determining element configured to determine whether, at a time period in the multimedia broadcast beginning at a time corresponding to the identified time start point in the supplemental content, an audio fingerprint of the sound track of the multimedia broadcast matches the identified audio fingerprint of the supplemental content; a monitoring element configured to monitor the sound track of the multimedia broadcast as the multimedia broadcast is obtained to determine whether the sound track of the multimedia broadcast contains an audio fingerprint that matches the identified audio fingerprint of the supplemental content, wherein the monitoring element monitors the sound track of the multimedia file, wherein the monitoring element monitors the sound track of the multimedia file responsive to the first determining element determining that at the time period in the multimedia broadcast beginning at the time corresponding to the identified time start point in the supplemental content the audio fingerprint of the sound track of the multimedia broadcast does not match the identified audio fingerprint of the supplemental content; a third identifying element configured to identify a fingerprint time period in the sound track of the multimedia broadcast where the multimedia broadcast contains the audio fingerprint that matches the identified audio fingerprint of the supplemental content, wherein the third identifying element identifies the fingerprint time period responsive to the monitoring element determining that the sound track of the multimedia broadcast contains an audio fingerprint that matches the identified audio fingerprint of the supplemental content; and a second determining element configured to determine an offset time difference between a start time of the fingerprint time period in the soundtrack of the multimedia broadcast and the time start point in the supplemental content associated with the identified audio fingerprint, wherein the second determining element determines the offset time difference responsive to the monitoring element determining that the sound track of the multimedia broadcast contains an audio fingerprint that matches the identified audio fingerprint of the supplemental content.

In one example, the instructions, when executed by the processor, implement a playing element configured to play the supplemental content as the multimedia broadcast is obtained.

In another example, the time start point associated with the audio fingerprint in the supplemental content is a time start point of a text entry in the supplemental content.

In another example, during playing of the supplemental content as the multimedia broadcast is obtained, the text entry in the supplement content is displayed at a timing that is corrected based upon the offset time difference.

In another example, the supplemental content includes therein a plurality of audio fingerprints and wherein each audio fingerprint included in the supplemental content is associated with a respective time start point.

In other examples, any steps described herein may be carried out in any appropriate desired order.

As described herein, various mechanisms dynamically adapt the timing of display of subtitles in a file. An audio fingerprint is used to univocally determine the moment a check-point is achieved. Once this audio fingerprint is identified in the multimedia file (or steam or broadcast), all the subtitles contained in the subtitle file are dynamically adjusted to the specific multimedia file (or steam or broadcast) being executed. Thus, the subtitle file is dynamically tailored specifically for the current multimedia file (or steam or broadcast).

As described herein, mechanisms to perform automatic synchronization of subtitles include: (a) obtaining a media file containing audio and visual references; (b) generating a captioning (e.g. data) file to register captioning texts, audio fingerprints and their respective timestamps; and (c) providing a media player, capable of parsing captioning files. In another example, instead of generating a captioning (e.g. data) file to register captioning texts, audio fingerprints and their respective timestamps an existing captioning (e.g., data) file may be modified to register captioning texts, audio fingerprints and their respective timestamps.

As described herein, various embodiments comprise, during a captioning file creation (or modification): (a) electing anchor points in a media file; (b) extracting audio fingerprints of selected anchor points; and (c) registering audio fingerprints and timestamp times in the captioning file.

As described herein, various embodiments comprise, during playback of a media file: (a) parsing a captioning file to extract audio fingerprint timestamps; (b) seeking (forward and/or backward) through the media file to the indicated moment of the first anchor; (c) extracting an audio fingerprint of the media file at the indicated moment; (d) comparing the audio fingerprint extracted from the media file against the anchor's audio fingerprint in the captioning file.

Further, if the audio fingerprints match, start executing the media file with captions. Otherwise, seek for the first anchor's audio fingerprint on the media file, calculate the differences in the timestamps, and propagate those differences to all the subsequent captions.

In another example, the process described herein can be repeated for a plurality of anchors (e.g., as many anchors as are defined in the captioning file).

As described herein is the use of an audio fingerprint as summarization data associated with a portion of the multimedia content. In various examples, such an audio fingerprint annotation contained in a subtitle text data is used to search and adjust the synchronization of subtitles data with the multimedia content.

As described herein, a comparison is made of audio fingerprints of defined check-points with the multimedia file being executed. In one scenario this comparison can be made only once when synchronizing an existing file containing all the subtitles, which makes it computationally efficient (in one example, the techniques disclosed herein are aimed at the synchronization of previously annotated subtitles).

As described herein, audio fingerprints may be used in a manner that guarantees the real-time adjustment of subtitles whose timestamps are not correctly aligned with the audio/video playback times, thereby allowing perfect synchronization of the medias.

As described herein, the synchronization process may be carried out automatically, without user intervention to adjust the subtitles to the audio (as the process relies on the audio fingerprint annotation). In one example, the disclosed techniques may automatically determine a time delay (or other offset), without user intervention.

As described herein, the audio fingerprints may be used as synchronization clues (as opposed to identifiers). As described herein, during playback of a multimedia stream, the following process may be performed: (a) media player starts the execution of multimedia stream and parsing of the captioning file (that contains the fingerprints); (b) the media player seeks to the times of the first and the last anchors and calculates the audio fingerprint of the media file at these specific moments; (c) media player compares the audio fingerprints from the captioning file against the ones extracted from the multimedia stream. If they match, the files are considered synchronized. If not, the media player seeks to the beginning of the multimedia stream and computes all of its fingerprints until a match with the first anchor is found. The difference between the media player's then-current time and the anchor's timestamp are propagated to all subsequent caption entries.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A computer-implemented method for synchronizing supplemental content to a multimedia stream, the method comprising:
    obtaining, by a processor, the multimedia stream;
    obtaining, by the processor, the supplemental content;
    identifying by the processor, beginning at an anchor time start point in the multimedia stream, an audio fingerprint of a sound track of the multimedia stream; and
    inserting by the processor into the supplemental content the audio fingerprint, wherein the audio fingerprint is inserted into the supplemental content in association with a time start point to match the audio fingerprint inserted into the supplemental content with the audio fingerprint of a sound track of the multimedia stream at a time period in the multimedia file beginning at the start point in the supplemental content,
    wherein the multimedia stream comprises a multimedia file, and
    wherein multiple audio fingerprints are identified at different time start points throughout the multimedia file, and the multiple audio fingerprints with corresponding time start points that match the respective different time start points in the multimedia file are inserted into the supplemental content, for allowing resynchronization of the supplemental content to the multimedia stream at the different time start points in the multimedia file that is played.

2. The method of claim 1, wherein the supplemental content comprises one of: (a) captions in the language of the sound track of the multimedia stream; (b) captions in a language different from the language of the sound track of the multimedia stream; and (c) a combination thereof.

3. The method of claim 1, wherein the supplemental content is in the form of a file.

4. The method of claim 1, wherein the time start point associated with the audio fingerprint in the supplemental content is a time start point of a text entry in the supplemental content.

5. The method of claim 1, wherein each time start point associated with each respective audio fingerprint in the supplemental content is a time start point of a respective text entry in the supplemental content.

6. A computer readable storage medium storing a program of instructions executable by a machine to perform a method of synchronizing supplemental content to a multimedia file, the method comprising:
    obtaining by a processor the multimedia file, wherein the multimedia file includes therein a soundtrack;
    obtaining by the processor the supplemental content, wherein the supplemental content includes therein at least one audio fingerprint and wherein the audio fingerprint included in the supplemental content is associated with a time start point;
    identifying by the processor, in the supplemental content, the audio fingerprint;
    identifying by the processor, in the supplemental content, the time start point associated with the identified audio fingerprint;
    determining by the processor whether, at a time period in the multimedia file beginning at a time corresponding to the identified time start point in the supplemental content, an audio fingerprint of the sound track of the multimedia file matches the identified audio fingerprint of the supplemental content;
    responsive to determining that at the time period in the multimedia file beginning at the time corresponding to the identified time start point in the supplemental content the audio fingerprint of the sound track of the multimedia file does not match the identified audio fingerprint of the supplemental content:
        searching, by the processor, the sound track of the multimedia file from a beginning of the multimedia file towards an end of the multimedia file to determine whether the sound track of the multimedia file contains an audio fingerprint that matches the identified audio fingerprint of the supplemental content; and responsive to determining that the sound track of the multimedia file contains an audio fingerprint that matches the identified audio fingerprint of the supplemental content:
  identifying, by the processor, a fingerprint time period in the sound track of the multimedia file where the multimedia file contains the audio fingerprint that matches the identified audio fingerprint of the supplemental content; and
  determining, by the processor, an offset time difference between a start time of the fingerprint time period in the soundtrack of the multimedia file and the time start point in the supplemental content associated with the identified audio fingerprint.

7. The computer readable storage medium of claim 6, further comprising playing, by the processor, the multimedia file and the supplemental content.

8. The computer readable storage medium of claim 7, wherein the time start point associated with the audio fingerprint in the supplemental content is a time start point of a text entry in the supplemental content.

9. The computer readable storage medium of claim 8, wherein, during playing of the multimedia file and the supplemental content, the text entry in the supplement content is displayed at a timing that is corrected based upon the offset time difference.

10. The computer readable storage medium of claim 6, wherein the multimedia file comprises one of: (a) a video clip; (b) a television program; and (c) a movie.

11. The computer readable storage medium of claim 6, wherein the supplemental content comprises one of: (a) captions in the language of the sound track of the multimedia file; (b) captions in a language different from the language of the sound track of the multimedia file; (c) a sound track different from the sound track of the multimedia file; and (d) a combination thereof.

12. The computer readable storage medium of claim 6, wherein the supplemental content is in the form of a file.

13. The computer readable storage medium of claim 6, wherein the supplemental content includes therein a plurality of audio fingerprints and wherein each audio fingerprint included in the supplemental content is associated with a respective time start point.

14. A computer readable storage medium storing a program of instructions executable by a machine to perform a method of synchronizing supplemental content to a multimedia broadcast, the method comprising:
  obtaining by a processor the multimedia broadcast, wherein the multimedia broadcast includes therein a soundtrack;
  obtaining by the processor the supplemental content, wherein the supplemental content includes therein at least one audio fingerprint and wherein the audio fingerprint included in the supplemental content is associated with a time start point;
  identifying by the processor, in the supplemental content, the audio fingerprint;
  identifying by the processor, in the supplemental content, the time start point associated with the identified audio fingerprint;
  determining by the processor whether, at a time period in the multimedia broadcast beginning at a time corresponding to the identified time start point in the supplemental content, an audio fingerprint of the sound track of the multimedia broadcast matches the identified audio fingerprint of the supplemental content;
  responsive to determining that at the time period in the multimedia broadcast beginning at the time corresponding to the identified time start point in the supplemental content the audio fingerprint of the sound track of the multimedia broadcast does not match the identified audio fingerprint of the supplemental content:
    monitoring, by the processor, the sound track of the multimedia broadcast as the multimedia broadcast is obtained to determine whether the sound track of the multimedia broadcast contains an audio fingerprint that matches the identified audio fingerprint of the supplemental content; and
  responsive to determining that the sound track of the multimedia broadcast contains an audio fingerprint that matches the identified audio fingerprint of the supplemental content:
    identifying, by the processor, a fingerprint time period in the sound track of the multimedia broadcast where the multimedia broadcast contains the audio fingerprint that matches the identified audio fingerprint of the supplemental content; and
    determining, by the processor, an offset time difference between a start time of the fingerprint time period in the soundtrack of the multimedia broadcast and the time start point in the supplemental content associated with the identified audio fingerprint.

15. The computer readable storage medium of claim 14, further comprising playing, by the processor, the supplemental content as the multimedia broadcast is obtained.

16. The computer readable storage medium of claim 15, wherein the time start point associated with the audio fingerprint in the supplemental content is a time start point of a text entry in the supplemental content.

17. The computer readable storage medium of claim 16, wherein, during playing of the supplemental content as the multimedia broadcast is obtained, the text entry in the supplement content is displayed at a timing that is corrected based upon the offset time difference.

18. The computer readable storage medium of claim 14, wherein the supplemental content includes therein a plurality of audio fingerprints and wherein each audio fingerprint included in the supplemental content is associated with a respective time start point.

* * * * *